US008843063B2

(12) United States Patent
Naniyat

(10) Patent No.: US 8,843,063 B2
(45) Date of Patent: Sep. 23, 2014

(54) METHOD AND SYSTEM FOR COMMUNICATION IN NEAR FIELD COMMUNICATION NETWORK

(71) Applicant: Samsung Electronics Co., Ltd., Gyeonggi-do (KR)

(72) Inventor: Arun Naniyat, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/774,626

(22) Filed: Feb. 22, 2013

(65) Prior Publication Data

US 2013/0165043 A1    Jun. 27, 2013

Related U.S. Application Data

(63) Continuation of application No. 12/244,495, filed on Oct. 2, 2008, now Pat. No. 8,385,823.

(30) Foreign Application Priority Data

Oct. 3, 2007 (IN) .......................... 2223/CHE/2007

(51) Int. Cl.
| | |
|---|---|
| *H04B 5/00* | (2006.01) |
| *H04W 76/02* | (2009.01) |
| *H04W 4/00* | (2009.01) |
| *H04W 8/00* | (2009.01) |
| *H04W 92/18* | (2009.01) |
| *H04L 29/08* | (2006.01) |

(52) U.S. Cl.
CPC .............. *H04W 4/008* (2013.01); *H04W 8/005* (2013.01); *H04W 92/18* (2013.01); *H04W 76/02* (2013.01); *H04L 67/04* (2013.01); *H04L 67/16* (2013.01)
USPC ......................................... 455/41.1; 370/469

(58) Field of Classification Search
USPC ................................................ 455/41.1, 41.2
See application file for complete search history.

(56) References Cited

U.S. PATENT DOCUMENTS

| | | | |
|---|---|---|---|
| 2003/0087658 A1 | 5/2003 | Dashevsky et al. | |
| 2003/0128195 A1 | 7/2003 | Banerjee et al. | |
| 2004/0116074 A1 | 6/2004 | Fujii et al. | |
| 2005/0030922 A1* | 2/2005 | Lee et al. ...................... | 370/331 |
| 2005/0255843 A1 | 11/2005 | Hilpisch et al. | |
| 2006/0133414 A1 | 6/2006 | Luoma et al. | |
| 2006/0142005 A1 | 6/2006 | Takaluoma et al. | |
| 2007/0011335 A1 | 1/2007 | Burns et al. | |
| 2007/0038854 A1 | 2/2007 | Cheon et al. | |
| 2007/0055633 A1 | 3/2007 | Cheon et al. | |
| 2007/0127427 A1* | 6/2007 | Tanaka .......................... | 370/338 |
| 2007/0141986 A1* | 6/2007 | Kuehnel et al. .............. | 455/41.2 |
| 2007/0155443 A1 | 7/2007 | Cheon et al. | |
| 2008/0065877 A1 | 3/2008 | Son et al. | |
| 2008/0291852 A1 | 11/2008 | Abel | |
| 2009/0034498 A1* | 2/2009 | Banerjea et al. .............. | 370/338 |

\* cited by examiner

*Primary Examiner* — Gennadiy Tsvey
(74) *Attorney, Agent, or Firm* — The Farrell Law Firm, P.C.

(57) ABSTRACT

A method and an electronic device for establishing, at a first electronic device, a communication link between the first electronic device and at least one other electronic device in a Near Field Communication (NFC) network are provided. The method includes setting up an underlying Media Access Control (MAC) link; sending a Parameter Exchange (PAX) command for exchanging parameters concerning a Logical Link Control Protocol (LLCP) to at least one other electronic device; receiving a response PAX command for exchanging parameters concerning the LLCP from at least one other electronic device; and establishing the communication link between the first electronic device and the at least one other electronic device based on the received response PAX command.

22 Claims, 5 Drawing Sheets

METHOD AND SYSTEM FOR COMMUNICATION IN NEAR FIELD COMMUNICATION NETWORK

PRIORITY

This is a Continuation of U.S. application Ser. No. 12/244,495, which was filed in the U.S. Patent and Trademark Office on Oct. 2, 2008, and application claims priority under 35 U.S.C. §119(a) to a patent application filed in the Indian Patent Office on Oct. 3, 2007 and assigned Serial No. 2223/CHE/2007, the entire contents of each of which are incorporated herein by reference.

BACKGROUND OF THE INVENTION

1. Field of the Invention

The present invention relates generally to communication in a short range wireless communication network. More particularly, the present invention relates to communication in a near field communication network.

2. Description of the Related Art

Portable electronic devices such as mobile phones, Personal Digital Assistants (PDAs), smart tags, audio/video equipment, and set-top boxes are frequently used for communication. Portable electronic devices can communicate with each other through short-range wireless communications. For example, a mobile phone can communicate with a PDA through short-range wireless communications, such as short-range radio (e.g., BLUETOOTH®), InfraRed light (IR), and Near Field Communications (NFC). BLUETOOTH®, as used herein, refers a short-range wireless communication protocol.

Near Field Communication (NFC) is a contactless-type short-range wireless communication technology. NFC utilizes a frequency band of 13.56 Megahertz and transmits data at a maximum rate of 424 Kbps. The electronic devices in NFC operate in a close proximity, for example, approximately 10 centimeters, and consume very little power. As a result, NFC is becoming a more prevalent technology for exchanging and sharing information in NFC compatible electronic devices.

NFC compatible electronic devices adhere to International Standards Organization (ISO) 18092 standards. Further, NFC compatible electronic devices can operate in deferent operating modes, for example, a reader/writer mode, a peer-to-peer mode, and a card emulation mode. The different operating modes are based on ISO/IEC 18092 NFC Interface Protocol (NFCIP)-1 and ISO/International Electrical Commission (IEC) 14443 contactless smart card standards. For clarity and for ease of description, the NFC compatible electronic devices will be referred to herein as electronic devices.

In the reader/writer mode, the electronic device is capable of reading NFC forum mandated tag types. A tag in this mode may be either active or passive. However, the tag becomes active and will be ready for communication when a reader electronic device is at a close proximity to the tag. In the Peer-to-Peer mode of operation, a legacy NFC electronic device works in a Half-Duplex mode of operation using protocols that enable Peer-to-Peer mode of operation. In the card emulation mode, the electronic devices acts as an NFC tag to work as a traditional contactless smart card.

In NFC, an electronic device can exchange information like phone numbers, images, audio/video files, and other applications with other electronic devices without user operation. However, the exchange of information content is usually only capable over a short distance and is based on a services and applications match.

For example, to set-up a connection and a communication between a first electronic device and a second electronic device, the electronic devices are initially brought into close proximity to each other. Thereafter, a connection is established. The first electronic device then sends a request for an exchange of information to the second electronic device. The request is associated with a predefined service/application in the first electronic device. The predefined service is then searched for in a plurality of services registered at an application layer in the second electronic device. Thereby, communication is established based on a predefined service match.

For example, if the first electronic device and the second electronic device have the predefined service, the communication process is initiated. However, if the predefined service is not matched, the second electronic device sends a notification to the first electronic device stating that there is no service match. Therefore, communication is not possible and the communication link cannot be created. This may lead to user inconveniences, as the user is notified only at the end of the method that the communication is not possible due to a mismatch of services. Further, the method is not time efficient.

Hence there exists a need to establish communication between electronic devices based on a plurality of services and applications.

SUMMARY OF THE INVENTION

Accordingly, the present invention has been provided to address the above-described problems and provide at least the advantages described below.

According to an aspect of the present invention, a method for establishing, at a first electronic device, a communication link between the first electronic device and at least one other electronic device in a Near Field Communication (NFC) network is provided. The method includes setting up an underlying Media Access Control (MAC) link; sending a Parameter Exchange (PAX) command for exchanging parameters concerning a Logical Link Control Protocol (LLCP) to at least one other electronic device; receiving a response PAX command for exchanging parameters concerning the LLCP from at least one other electronic device; and establishing the communication link between the first electronic device and the at least one other electronic device based on the received response PAX command.

According to another aspect of the present invention, an electronic device for establishing a communication link between the electronic device and at least one other electronic device in a Near Field Communication (NFC) network is provided. The device includes a transceiver for setting up an underlying Media Access Control (MAC) link and sending a Parameter Exchange (PAX) command for exchanging parameters concerning a Logical Link Control Protocol (LLCP) to at least one other electronic device, and receiving a response PAX command for exchanging parameters concerning the LLCP from at least one other electronic device; and a processor for controlling the transceiver to establish the communication link between the electronic device and the at least one other electronic device based on the received response PAX command.

According to another aspect of the present invention, a method for establishing, at a first electronic device, a communication link between the first electronic device and at least one other electronic device in a Near Field Communication (NFC) network is provided. The method includes setting up an underlying Media Access Control (MAC) link; receiving a Parameter Exchange (PAX) command for exchanging parameters concerning a Logical Link Control Protocol (LLCP) from at least one other electronic device; sending a response PAX command for exchanging parameters concerning the LLCP to at least one other electronic device; and establishing the communication link between the first electronic device and the at least one other electronic device.

According to another aspect of the present invention, an electronic device for establishing a communication link between the electronic device and at least one other electronic device in a Near Field Communication (NFC) network is provided. The device includes a transceiver for setting up an underlying Media Access Control (MAC) link and receiving a Parameter Exchange (PAX) command for exchanging parameters concerning a Logical Link Control Protocol (LLCP) from at least one other electronic device, and sending a response PAX command for exchanging parameters concerning the LLCP from at least one other electronic device; and a processor for controlling the transceiver to establish the communication link between the electronic device and the at least one other electronic device.

BRIEF DESCRIPTION OF THE DRAWINGS

The above and other aspects, features, and advantages of the present invention will become more apparent from the ensuing detailed description of the invention taken in conjunction with the accompanying drawings, in which.

DETAILED DESCRIPTION OF EMBODIMENTS OF THE PRESENT INVENTION

It should be understood that the terms used to describe various embodiments herein are provided to merely aid the understanding of the description, and that the use and definitions of the terms in no way limits the scope of the invention. Terms such as "first", "second", etc., are used to differentiate between objects having the same terminology and are nowhere intended to represent a chronological order, except where stated otherwise. A set is defined as a non-empty set including at least one element.

Figure 1:
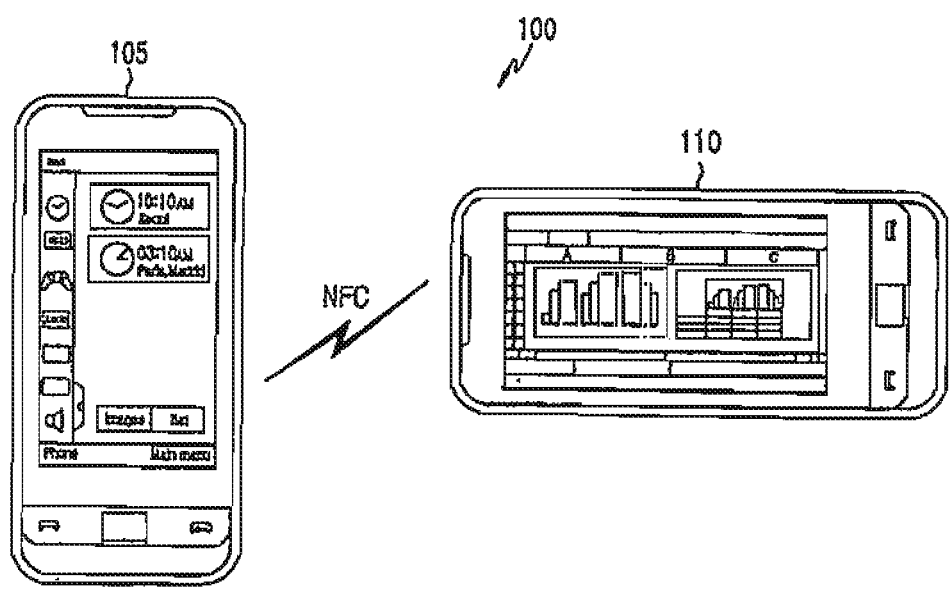
FIG. 1 illustrates an exemplary environment in which various embodiments of the present invention can be practiced.

FIG. 1 illustrates an exemplary environment 100 in which various embodiments of the present invention can be practiced. The environment 100 includes a plurality of electronic devices, for example, an electronic device 105 and an electronic device 110. However, although only two electronic devices are shown in the environment 100, it will be apparent to the person ordinary skilled in the art that the environment 100 may include more electronic devices. The examples of the electronic devices 105 and 110 include, but are not limited to, mobile phones, smart tags, Personal Digital Assistants (PDAs), and computers. The electronic devices are capable of communicating with each other through a communication network.

According to an embodiment of the present invention, the electronic devices 105 and 110 are capable of communicating with each other through short-range wireless communication technology. Examples of short-range wireless communication technology include but are not limited to, BLUETOOTH® short-range radio communications, InfraRed (IR) light, and Near Field Communication (NFC). In FIG. 1, the electronic devices 105 and 110 are capable of communicating with each other through Near Field Communication (NFC) technology.

In the environment 100, a user of the electronic device 105 can view applications and services registered at the electronic device 110. Thereafter, a communication link between the electronic devices is established. A service is defined as an application that utilizes an LLCP and is also registered with the LLCP. For communication, initially, the user should bring the electronic device 105 within a predefined distance of the electronic device 110. According to an embodiment of the present invention, the predefined distance is specific to the standards of a communication technology. For example, in NFC, the predefined distance can be less than approximately 10 centimeters. When an initial communication link, e.g., a Media Access Control (MAC) link, is established between electronic devices 105 and 110, the data can be shared and exchanged through a plurality of protocols.

One of the plurality of protocols is a Link Layer Control Protocol (LLCP), which operates according to ISO 18092 protocols and functions in a state-oriented fashion. The LLCP is associated with a plurality of functionalities in NFC. For example, a functionality of the LLCP is to enable a semi-bidirectional manner of operating in an NFC physical layer. Various applications can be registered at the LLCP. Examples of applications include a plurality of NFC Record Type Definitions (RTDs), a plurality of Internet Protocol (IP)-based applications, a plurality of OBject EXchange (OBEX) applications, a plurality of short range communication applications, etc. Using the LLCP, the electronic device 105 can identify different applications/services in the electronic device 110. Thereafter, the identified services are matched with a plurality of services registered in the electronic device 105. In this description, services are often referred to as applications.

The electronic device 105, after identifying and matching the services, can set-up an initial connection. For example, if the OBEX application is present in both the electronic devices 105 and 110, then the connection can be established and OBEX communication can be initiated, which is also called as service discovery based communication. Accordingly, the service discovery mechanism will enable the electronic device 105 to understand and identify services registered at the electronic device 110, and thereafter, establish a connection based on the matched services.

Figure 2:
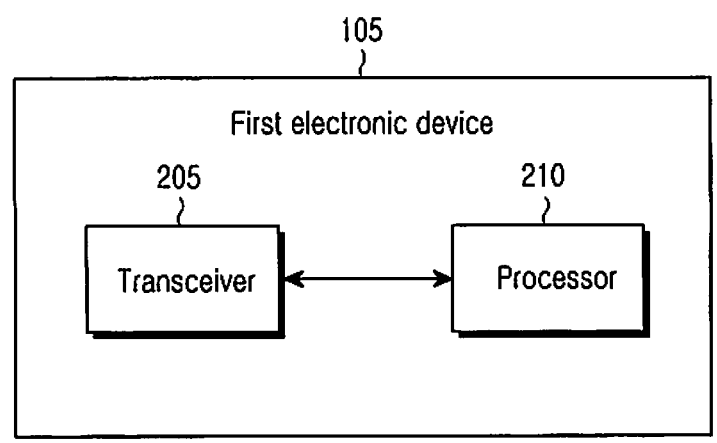
FIG. 2 illustrates a first electronic device in accordance with an embodiment of the present invention.

FIG. 2 illustrates a first electronic device in accordance with an embodiment of the present invention. To better explain the first electronic device, references will be made to FIG. 1. However, it will be apparent to a person ordinarily skilled in the art that the present embodiment can be explained in reference to any other suitable embodiment of the present invention.

Referring to FIG. 2, the electronic device 105 includes a transceiver 205 and a processor 210. The transceiver 205 is capable of receiving and sending data from/to the electronic device 110. In an embodiment, the transceiver 205 is a short-range transceiver. In the environment 100, when the electronic device 110, which is capable of communicating through NFC, touches the electronic device 105, an initial communication link is established between the electronic devices 105 and 110 through the transceiver 205. The transceiver 205 and the processor 210 have the necessary protocols such as LLCP, Digital protocol, NFC Data Exchange Format (NDEF), and NFC records for NFC operation.

The transceiver-side LLCP layer is also capable of receiving and sending PAX commands. PAX commands are utilized in the LLCP layer for exchange of generic parameters. In this invention, PAX commands enables a plurality of electronic devices, for example, the electronic device 105 and the electronic device 110, to discover services registered at the LLCP. The PAX command includes a PAX Protocol Data Unit (PDU) that enables the electronic device to identify and announce services registered at the LLCP. The PAX PDU will be explained in detail with reference to FIG. 3.

Initially, the electronic device 105, after detecting the plurality of services registered at the LLCP, matches the plurality of services discovered and a first set of services. The first set of services is a plurality of services registered at an LLCP layer in the electronic device 105.

According to an embodiment of the present invention, the processor 210 enables the electronic device 105 to discover a plurality of services of the neighboring devices, for example the electronic device 110. The processor 210 also compares the plurality of services discovered with the first set of services registered in the electronic device 105. The processor 210 enables the electronic device 105 to identify the services registered at LLCP in the device. Thereafter, the transceiver 205 announces the discovered services. The transceiver 205 announces the services registered at the LLCP during every predefined interval of time. Accordingly, other electronic devices in a close vicinity of the electronic device 105 may automatically discover the services registered in the electronic device 105.

Figure 3:
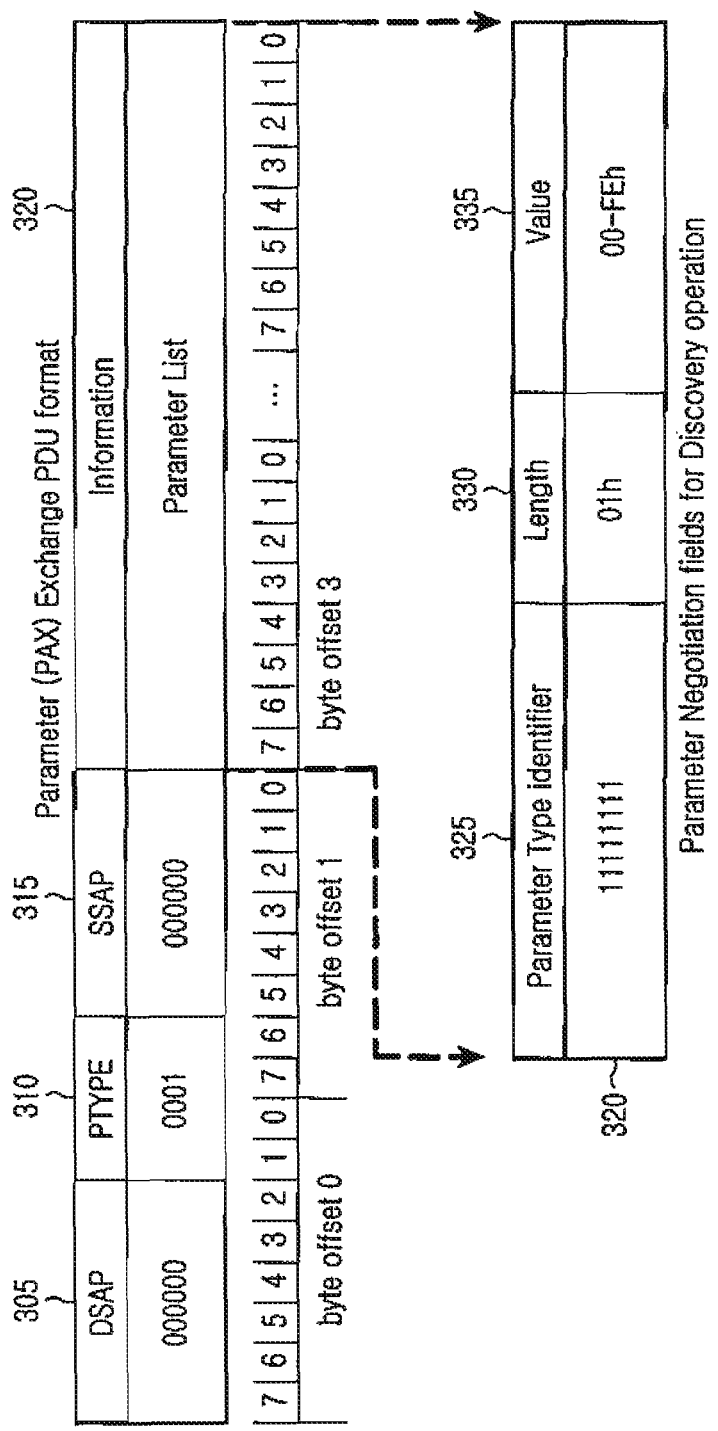
FIG. 3 illustrates a PArameter eXchange (PAX) protocol data unit in accordance with an embodiment of the present invention.

FIG. 3 illustrates a PAX PDU in accordance with an embodiment of the present invention.

Referring to FIG. 3, in the environment 100, information associated with the services registered at the LLCP in the plurality of electronic devices can be exchanged using standard PDU formats. In an embodiment, a plurality of PDUs is exchanged between peer LLCP endpoints for an exchange of LLCP control-related information. According to an embodiment of the present invention, the electronic devices operate in a peer-to-peer operating mode of the NFC. Though the present invention is described herein with reference to the peer-to-peer operating mode of NFC, it should be apparent to the person ordinary skilled in the art that the invention can be practiced with other operating modes of NFC (e.g., a reader/writer mode and a card emulation mode).

According to an embodiment of the present invention, the electronic device 105 and the electronic device 110 are also called LLCP endpoints. For establishing a LLCP connection and/or passing data between LLCP endpoints, the plurality of PDUs are exchanged between the electronic devices. The standard LLCP PDU format is divided in a plurality of fields. The plurality of fields is associated with a plurality of information. For example, the PDU includes a Destination Service Access Point (DSAP) address field 305, a PDU type field (PTYPE) 310, which is the Payload Type information mentioning the type of the LLCP PDU, and a Source Service Access Point (SSAP) address field 315. The DSAP field 305 in the LLCP identifies the destination protocol according to the registration procedures. The registration process sets aside an addressing mechanism for Destination and Source Access points for registering applications. These predefined services are maintained within the device by the LLCP prior to an LLCP link setup.

According to an embodiment of the present invention, an LLCP PAX PDU type is used for exchanging information associated with a plurality of services registered at the LLCP. The PAX PDU can be used for plurality of purposes, including providing information about a predefined service. For example, the PAX PDU can be used to announce services registered at the LLCP. The PAX PDU can also be used for a negotiation mode. For example, the PAX PDU can be used for negotiating services search between the peer LLCP entities. It should be apparent to the person skilled in the art that the PAX PDU can have different fields and the fields may vary in lengths.

The information field 320 in the PAX PDU includes a plurality of information related to discovery related functionality. In an embodiment of the present invention, the information field provides a parameter negotiation information fields for discovery operation. The parameter negotiation information fields carry the information related to parameter type operation. For the discovery specific operation, the parameter type will be used for discovery related activity. The parameter negotiations information includes a plurality of fields, for example, a parameter type identifier field 325, a Length field 330, and a Value field 335.

The Parameter Type identifier field 325 in the Parameter Negotiation field 320 identifies a PAX command type. For example, the Parameter Type identifier field 325 will identify that the PAX command is for a discovery mechanism. A predefined value can be set in the Parameter Type identifier field 325 to identify the discovery mechanism. For example, the predefined value can be set as 11111111 (FFh) for the discovery related parameter. The predefined value 11111111 (FFh) is set as an exemplary value. It should be apparent to the person skilled in the art that the predefined value can be any value based on the length of the Parameter Type identifier field 325.

The length field 330 in the Parameter Negotiation field 330 identifies the length of associated parameters for the discovery information. The Value field 335 identifies a type of discovery information that the PAX command provides. The value field 335 has a size of two '2' octets and can signify a plurality of information. For example, a value of '01h' in the Value field 335 can signify a Generic control RTD. Similarly, the value '02h' can signify Handover RTD, etc. The values indicated above are provided merely to describe the present invention and nowhere limit the scope of the invention. Further, a person ordinary skilled in the art can understand that the value field 335 may have any value based on the size limit of Value field. In an embodiment of the present invention, the value field 335 lists information about Standard Applications, i.e., Application services that use NFC communication. The value field length illustrated in FIG. 3 has a size of two octets by way of example, and may have different length.

As described above, he electronic device 105 and the electronic device 110 initially set up an underlying MAC link. Thereafter, before the LLCP based connection setup can occur, the LLCP in the electronic device 105 uses a PAX PDU to exchange discovery related mechanism for establishing an LLCP link. According to an embodiment of the present invention, the LLCP link is established, if the services registered at the electronic device 110 and services registered in the electronic device 105 are exchanged. In another embodiment, the LLCP link need not be established if the services at the electronic device 110 do not match the services at the electronic device 105. Accordingly, the method and the PAX PDU provide a means through which an LLCP link setup or connection between different service access points negotiation are performed, when it is determined that services at the plurality of electronic devices are matched.

Figure 4:
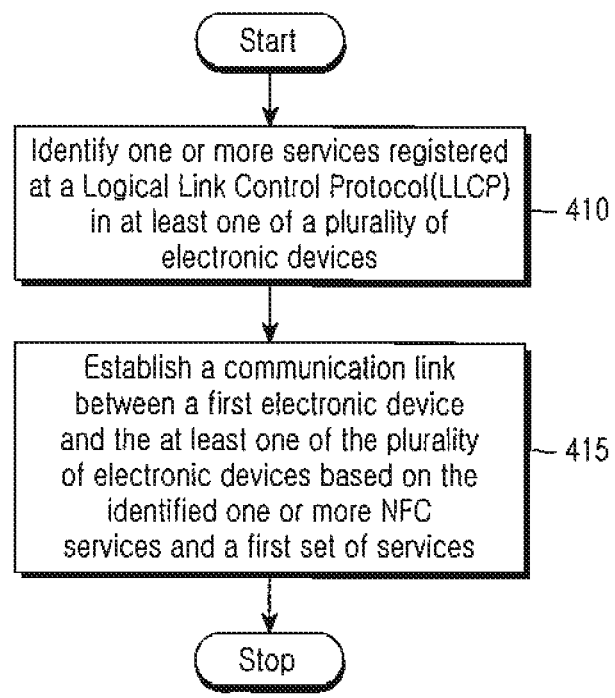
FIG. 4 illustrates a flow chart of a method for establishing communication in Near Field Communication (NFC) network in accordance with an embodiment of the present invention.

FIG. 4 illustrates a flow chart of a method for establishing communication in Near Field Communication (NFC) network in accordance with an embodiment of the present invention.

Referring to FIG. 4, a first electronic device, for example the electronic device 105, sends an indication to another electronic device, for example, the electronic device 110 for establishing a communication link. The indication is automatically sent to another electronic device when the electronic devices are brought within a predefined distance of another electronic device. For example, when the electronic device 105 is in a close proximity, for example, approximately 10 centimeters, of the electronic device 110, an indication is sent to the electronic device 110. When an initial communication link, for example a MAC link, is established, the electronic device becomes active for exchanging information and/or data. At step 410, the electronic device identifies at least one service registered at an LLCP in at least one of the plurality of electronic devices. The electronic device 105 will identify at least one service registered at an LLCP in the electronic device 110.

For identifying the services, the electronic device 105 will send at least one PAX command to the electronic device 110. The PAX command includes a PAX PDU, for example, the PAX PDU 300. The services are identified based on a source address, a destination address pair and additional information. After receiving the PAX commands, the electronic device 110 will parse through the at least one PAX command. Thereafter, the electronic device 110 will respond to the electronic device 105 based on the parsed at least one PAX command. The electronic device 110 in the response will send information about a plurality of services registered at the LLCP in the electronic device 110. For example, the electronic device 110 can send information associated with the service match, service un-matched service information, additional services offered by this device, etc. The electronic device 110 will send the response using at least one PAX command. The electronic device 105 will then analyze the response received from the electronic device 110.

At step 415, the electronic device will establish the communication link between the first electronic device and the at least one of the plurality of electronic devices based on the identified at least one service and a first set of services. For example, the electronic device 105 will establish the communication link with the electronic device 110 based on the identified services and the first set of services. The first set of services is selected from a plurality of services registered at a LLCP in the first electronic device.

Figure 5:
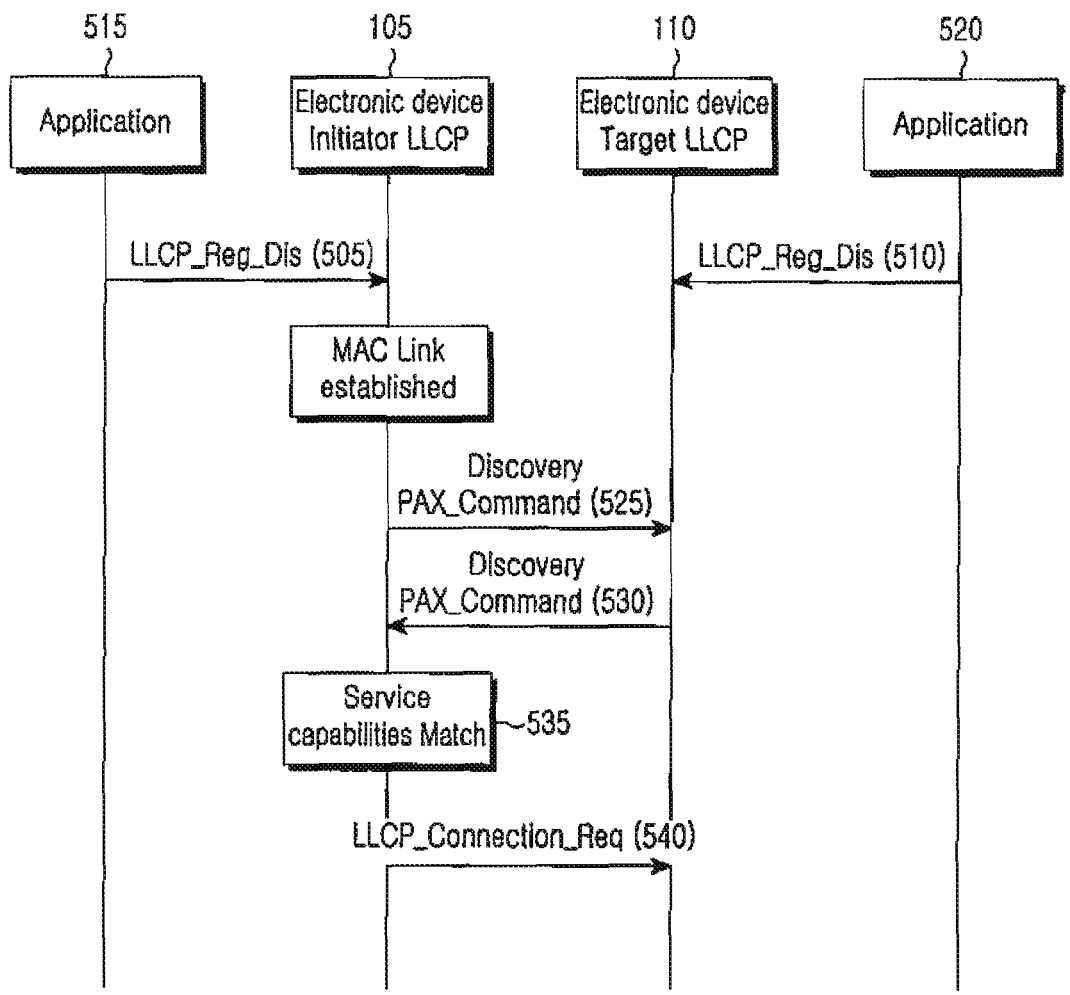
FIG. 5 illustrates a message flow diagram of a method for establishing communication in Near Field Communication (NFC) network in accordance with an embodiment of the present invention.

FIG. 5 illustrates a message flow diagram of a method for establishing communication in an NFC network, in accordance with an embodiment of the present invention. A plurality of applications is initially registered at a plurality of electronic devices, e.g., the electronic device 105 and the electronic device 110. For ease of this description, the electronic device 105 and the electronic device 110 are also referred as "Initiator LLCP" and "Target LLCP", respectively.

At step 505, an application 515 is registered at the LLCP in the electronic device 105. Similarly, at step 510, an application 520 is registered at the LLCP in the electronic device 110. The applications 515 and 520 are registered using LLCP_Reg_Dis primitive. A specific code is assigned to each of the plurality of applications that are residing over LLCP layer. At step 525, the electronic device 105 will send at least one PAX command to the electronic device 110 for a service request. The electronic device 110, after receiving the at least one PAX command, will parse through the at least one PAX command. Thereafter, at step 530, the electronic device 110 will respond to the electronic device 105 based on the parsed at least one PAX command. The services request is identified from the Value field 335 in the PAX commands. The PAX response may include services that are independent from the services announced in the initial PAX command. The service supported in each device is announced by the device using the PAX command. The link is established without performing services based negotiations and/or agreements.

The electronic device 110 responds with the same PAX command contents. The response is performed when there is a match between services registered at the LLCP in both the electronic devices 105 and 110. The electronic device 110 may respond with a predefined value, for example, "FFh". This response is performed when there is a mismatch between the services registered at the electronic devices 105 and 110. There may be no response from the electronic device 110 based on a predefined condition, such as when there is just an announcement of services. The electronic device 110 may send at least one PAX command as a response. In a PAX command interchange, short discovery details are exchanged for establishing a LLCP link based on service discovery.

At step 535, the services compatibilities match is performed at the electronic device 105. Further, a request for connection is sent from the electronic device 105 to the electronic device 110, if there is a service match between the electronic devices 105 and 110. The request is sent through the LLCP_Connection_Req primitive. Thereafter, the connection between the electronic device 105 and the electronic device 110 can be is established based on the discovered and/or identified services.

Various embodiments of the present invention described above may provide at least, but are not limited to, the following advantages.

The present invention provides a method for service discovery in an NFC network. The method enables plurality of electronic devices to establish LLCP link based on an application request. In this method, electronic devices may discover different services registered at LLCP. Further, the method enables a faster discovery mechanism that will reduce time required for a Logical Link setup between two electronic devices.

Through this method a user can optionally register applications with an LLCP. Thereafter, the services can be announced without establishing a connection.

Similarly, records, for example, NDEF records, are initially parsed, i.e., are not parsed at a later time. As such, the parsed records can be tracked for later use. This tracking reduces time required in exchanging information between the electronic devices. Hence, the method increases communication performance between electronic devices.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for establishing, at a first electronic device, a communication link between the first electronic device and at least one other electronic device in a Near Field Communication (NFC) network, the method comprising:

sending, to the at least one other electronic device, after setting up an underlying Media Access Control (MAC) link between the first electronic device and the at least one other electronic device, a Parameter Exchange (PAX) command for exchanging parameters concerning a Logical Link Control Protocol (LLCP) link to be established with the at least one other electronic device;

receiving, from the at least one other electronic device, in response to the PAX command, a response PAX command for exchanging parameters concerning the LLCP link; and establishing the LLCP link between the first electronic device and the at least one other electronic device based on the response PAX command, wherein the PAX command comprises a parameter list of at least one service registered in the first electronic device.

2. The method of claim 1, wherein the PAX command comprises a service discovery request for returning a parameter list of at least one service registered in the at least one other electronic device.

3. The method of claim 2, wherein the PAX command comprises at least one of a type of service, a length of parameter information, a parameter type identifier, a parameter negotiation field, a service discovery operation identifier, and an announcement operation identifier.

4. The method of claim 2, wherein the response PAX command comprises the parameter list of the at least one service registered in the at least one other electronic device.

5. The method of claim 4, wherein the response PAX command comprises at least one of a type of service, a length of parameter information, a parameter type identifier, a parameter negotiation field, a service discovery operation identifier, and an announcement operation identifier.

6. The method of claim 1, wherein establishing the LLCP link comprises:

matching a parameter list of at least one service registered in the at least one other electronic device and the parameter list of the at least one service registered in the first electronic device; and setting up a communication channel based on the matching result.

7. An electronic device for establishing a communication link between the electronic device and at least one other electronic device in a Near Field Communication (NFC) network, the device comprising:

a transceiver for sending, after setting up an underlying Media Access Control (MAC) link between the electronic device and the at least one other electronic device, a Parameter Exchange (PAX) command for exchanging parameters concerning a Logical Link Control Protocol (LLCP) link to be established between the electronic device and the at least one other electronic device, and receiving, from the at least one other electronic device, in response to the PAX command, a response PAX command for exchanging parameters concerning the LLCP link; and a processor for controlling the transceiver to establish the LLCP link between the electronic device and the at least one other electronic device based on the response PAX command, wherein the PAX command comprises a parameter list of at least one service registered in the electronic device.

8. The device of claim 7, wherein the PAX command comprises a service discovery request for returning a parameter list of at least one service registered in the at least one other electronic device.

9. The device of claim 8, wherein the PAX command comprises at least one of a type of service, a length of parameter information, a parameter type identifier, a parameter negotiation field, a service discovery operation identifier, and an announcement operation identifier.

10. The device of claim 8, wherein the response PAX command comprises the parameter list of the at least one service registered in the at least one other electronic device.

11. The device of claim 10, wherein the response PAX command comprises at least one of a type of service, a length of parameter information, a parameter type identifier, a parameter negotiation field, a service discovery operation identifier, and an announcement operation identifier.

12. The device of claim 7, wherein the processor matches a parameter list of at least one service registered in the at least one other electronic device and the parameter list of the at least one service registered in the electronic device and controls the transceiver to set up a communication channel based on the matching result.

13. A method for establishing, at a first electronic device, a communication link between the first electronic device and at least one other electronic device in a Near Field Communication (NFC) network, the method comprising:

receiving, from the at least one other electronic device, after setting up an underlying Media Access Control (MAC) link between the electronic device and the at least one other electronic device, a Parameter Exchange (PAX) command for exchanging parameters concerning a Logical Link Control Protocol (LLCP) link to be established between the electronic device and the at least one other electronic device;

sending, to the at least one other electronic device, in response to the received PAX command, a response PAX command for exchanging parameters concerning the LLCP link; and establishing the communication LLCP link between the first electronic device and the at least one other electronic device, wherein the PAX command comprises a parameter list of at least one service registered in the at least one other electronic device.

14. The method of claim 13, wherein the PAX command comprises a service discovery request for returning a parameter list of at least one service registered in the first electronic device.

15. The method of claim 14, wherein the PAX command comprises at least one of a type of service, a length of parameter information, a parameter type identifier, a parameter negotiation field, a service discovery operation identifier, and an announcement operation identifier.

16. The method of claim 14, wherein the response PAX command comprises the parameter list of the at least one service registered in the first electronic device.

17. The method of claim 16, wherein the response PAX command comprises at least one of a type of service, a length of parameter information, a parameter type identifier, a parameter negotiation field, a service discovery operation identifier, and an announcement operation identifier.

18. An electronic device for establishing a communication link between the electronic device and at least one other electronic device in a Near Field Communication (NFC) network, the device comprising:

a transceiver for receiving, from the at least one other electronic device, after setting up an underlying Media Access Control (MAC) link between the electronic device and the at least one other electronic device, a Parameter Exchange (PAX) command for exchanging parameters concerning a Logical Link Control Protocol (LLCP) link to be established between the electronic device and the at least one other electronic device, and sending, to the at least one other electronic device, in response to the received PAX command, a response PAX command for exchanging parameters concerning the LLCP link; and a processor for controlling the transceiver to establish the LLCP link between the electronic device and the at least one other electronic device, wherein the PAX command comprises a parameter list of at least one service registered in the at least one other electronic device, and the response PAX command comprises a parameter list of at least one service registered in the electronic device.

19. The device of claim 18, wherein the PAX command comprises a service discovery request for returning a parameter list of at least one service registered in the electronic device.

20. The device of claim 19, wherein the PAX command comprises at least one of a type of service, a length of parameter information, a parameter type identifier, a parameter negotiation field, a service discovery operation identifier, and an announcement operation identifier.

21. The device of claim 19, wherein the response PAX command comprises the parameter list for the at least one service registered in the electronic device.

22. The device of claim 21, wherein the response PAX command comprises at least one of a type of service, a length of parameter information, a parameter type identifier, a parameter negotiation field, a service discovery operation identifier, and an announcement operation identifier.

* * * * *